US009061912B2

(12) United States Patent
Zhang (10) Patent No.: US 9,061,912 B2
(45) Date of Patent: Jun. 23, 2015

(54) METHODS OF FABRICATION OF GRAPHENE NANORIBBONS

(71) Applicant: Yuegang Zhang, Cupertino, CA (US)

(72) Inventor: Yuegang Zhang, Cupertino, CA (US)

(73) Assignee: The Regents of the University of California, Oakland, CA (US)

( * ) Notice: Subject to any disclaimer, the term of this patent is extended or adjusted under 35 U.S.C. 154(b) by 16 days.

(21) Appl. No.: 13/910,327

(22) Filed: Jun. 5, 2013

(65) Prior Publication Data

US 2013/0330523 A1 Dec. 12, 2013

Related U.S. Application Data

(60) Provisional application No. 61/656,669, filed on Jun. 7, 2012.

(51) Int. Cl.
| | |
|---|---|
| *C23C 16/26* | (2006.01) |
| *C01B 31/02* | (2006.01) |
| *B82Y 30/00* | (2011.01) |
| *C01B 31/04* | (2006.01) |
| *B82Y 40/00* | (2011.01) |

(52) U.S. Cl.
CPC .......... *C01B 31/0213* (2013.01); *Y10S 977/891* (2013.01); *Y10S 977/734* (2013.01); *B82Y 30/00* (2013.01); *Y10T 428/24802* (2015.01); *Y10T 428/26* (2015.01); *C01B 31/0453* (2013.01); *C01B 2204/06* (2013.01); *B82Y 40/00* (2013.01)

(58) Field of Classification Search
CPC ...................................................... C23C 16/26
USPC ............................ 427/249.1, 250, 255.7, 282
See application file for complete search history.

(56) References Cited

U.S. PATENT DOCUMENTS

| | | | |
|---|---|---|---|
| 2011/0059599 A1* | 3/2011 | Ward et al. ..................... | 438/507 |
| 2011/0269299 A1 | 11/2011 | Zhang et al. | |
| 2012/0085991 A1* | 4/2012 | Cohen et al. .................... | 257/28 |
| 2012/0141799 A1* | 6/2012 | Kub et al. ...................... | 428/408 |
| 2012/0241069 A1* | 9/2012 | Hofmann et al. ............... | 156/60 |
| 2012/0292602 A1* | 11/2012 | Guo et al. ....................... | 257/40 |
| 2012/0325305 A1* | 12/2012 | Chandra et al. ............... | 136/256 |
| 2013/0098540 A1* | 4/2013 | Lee et al. ....................... | 156/230 |
| 2013/0156678 A1* | 6/2013 | Banerjee et al. .......... | 423/445 R |
| 2013/0161587 A1* | 6/2013 | Xianyu et al. .................. | 257/29 |
| 2014/0120270 A1* | 5/2014 | Tour et al. ..................... | 427/596 |

OTHER PUBLICATIONS

Lee, Woo-Kyung, et al., "Chemically Isolated Graphene Nanoribbons Reversibly Formed in Fluorographene Using Polymer Nanowire Masks". Nano Letters 2011, 11, 5461-5464.*
Bai, Jingwei, et al., "Rational Fabrication of Graphene Nanoribbons Using a Nanowire Etch Mask". Nano Letters 2009, vol. 9 No. 5, 2083-2087.*

(Continued)

*Primary Examiner* — Bret Chen
(74) *Attorney, Agent, or Firm* — Lawrence Berkeley National Laboratory (57) ABSTRACT

Methods of fabricating graphene nanoribbons include depositing a catalyst layer on a substrate. A masking layer is deposited on the catalyst layer. The masking layer and the catalyst layer are etched to form a structure on the substrate, the structure comprising a portion of the catalyst layer and a portion of the masking layer disposed on the catalyst layer, with sidewalls of the catalyst layer being exposed. A graphene layer is formed on a sidewall of the catalyst layer with a carbon-containing gas.

15 Claims, 5 Drawing Sheets

(56) References Cited

OTHER PUBLICATIONS

Kang, Chang Goo, et al., "Characteristics of CVD graphene nanoribbon formed by a ZnO nanowire hardmask". Nanotechnology 22 (2011) 295201 pp. 1-6.*
Feng, Ji, et al., "Patterning of graphene". Nanoscale, 2012, 4, 4883-4899.*
Park, Jang-Ung, et al., "Synthesis of monolithic graphene—graphite integrated electronics". Nature Materials DOI:10.1038/nmat3169; 2011, pp. 1-16.*
Melinte, G., et al., "A 3D insight on the catalytic nanostructuration of few-layer graphene". Nature Communications 5:4109; DOI: 10.1038/ncomms5109; Jun. 2014, pp. 1-8.*
Iñigo Martin-Fernandez, Debin Wang, and Yuegang Zhang, "Direct Growth of Graphene Nanoribbons for Large-Scale Device Fabrication," Nano Lett., 2012, 12 (12), pp. 6175-6179.
Geim, A. K.; Novoselov, K. S. "The rise of grapheme" Nat. Mater. 2007, 6, 183-191.
Castro Neto, A. H.; Peres, N. M. R.; Novoselov, K. S.; Geim, A. K. "The electronic properties of grapheme" Rev. Mod. Phys. 2009, 81, 109-162.
Schwierz, F. "Graphene transistors" Nat. Nanotechnol. 2010, 5, 487-496.
Zhang, Y.; Tang, T.-T.; Girit, C.; Hao, Z.; Martin, M. C.; Zettl, A.; Crommie, M. F.; Shen, Y. R.; Wang, F. "Direct observation of a widely tunable bandgap in bilayer grapheme" Nature 2009, 459, 820-823.
Guinea, F.; Katsnelson M. I.; Geim, A. K. "Energy gaps and a zero-field quantum Hall effect in graphene by strain engineering" Nat. Phys. 2010, Published online Sep. 27, 2009; 6, 30-33.
Bai, J.; Zhong, X.; Jiang, S.; Huang, Y.; Duan, X. "Graphene nanomesh" Nat. Nanotechnol. 2010, 5, 190-194.
Jiao, L.; Zhang, L.; Wang, X.; Diankov, G.; Dai, H. "Narrow graphene nanoribbons from carbon nanotubes" Nature 2009, 458, 877-880.
Bai, J.; Duan, X.; Huang, Y. "Rational Fabrication of Graphene Nanoribbons Using a Nanowire Etch Mask" Nano Lett. 2009, 9, 2083-2087.
Jiao, L.; Wang, X.; Diankov, G.; Wang, H.; Dai, H. "Facile synthesis of high-quality graphene nanoribbons" Nat. Nanotechnol. 2010, 5, 321-325.
Li, X. L.; Wang, X. R.; Zhang, L.; Lee, S. W.; Dai, H. J. "Chemically Derived, Ultrasmooth Graphene Nanoribbon Semiconductors" Science 2008, 319, 1229-1232.
Cai, J.; Ruffieux, P.; Jaafar, R.; Bieri, M.; Braun, T.; Blankenburg, S.; Muoth, M.; Seitsonen, A. P.; Saleh, M.; Feng, X.; Muellen, K.; Fasel, R. "Atomically precise bottom-up fabrication of graphene nanoribbons" Nature 2010, 466, 470-473.
Sprinkle, M.; Ruan, M.; Hu, Y.; Hankinson, J.; Rubio-Roy, M.; Zhang, B.; Wu, X.; Berger, C.; De Heer, W.A. "Scalable templated growth of graphene nanoribbons on SiC" Nat. Nanotechnol. 2010, 5, 727-731.
Han, M.; Özyilmaz, B.; Zhang, Y.; Kim, P. "Energy Band-Gap Engineering of Graphene Nanoribbons" Phys. Rev. Lett. 2007, 98, 206805-1 to 206805-4.
Chien, Z.; Lin, Y.-M.; Rooks, M. J.; Avouris, P. "Graphene nanoribbon electronics" Physica E 2007, 40, 228-232.
Kato, T.; Hatakeyama, R. "Site- and alignment-controlled growth of graphene nanoribbons from nickel nanobars" Nat. Nanotechnol. 2012, 7, 651-6.
Son, Y. W.; Cohen, M. L.; Louie, S. G. "Energy Gaps in Graphene Nanoribbons" Phys. Rev. Lett. 2006, 97, 216803-1 to 216803-4.
Yang, L.; Park, C. H.; Son, Y.W.; Cohen, M. L.; Louie, S. G. "Quasiparticle Energies and Band Gaps in Graphene Nanoribbons" Phys. Rev. Lett. 2007, 99, 186801-1 to 186801-4.
Basu, D.; Gilbert, M. J.; Register, L. F.; Banerjee, S. K.; MacDonald, A. H. "Effect of edge roughness on electronic transport in graphene nanoribbon channel metal-oxide-semiconductor field-effect transistors" Appl. Phys. Lett. 2008, 92, 42114.

Yoon, Y.; Guo, J. "Effect of edge roughness in graphene nanoribbon transistors" Appl. Phys. Lett. 2007, 91, 73103.
Ryu, S.; Maultzsch, J.; Han, M. Y.; Kim, P.; Brus, L. E. "Raman Spectroscopy of Lithographically Patterned Graphene Nanoribbons" ACS Nano 2011, 5, 4123-4130.
Bischoff, D.; Güttinger, J.; Dröscher, S.; Ihn, T.; Ensslin, K.; Stampfer, C. "Raman spectroscopy on etched graphene nanoribbons" J. Appl. Phys. 2011, 109, 073710.
Wang, R.; Hao, Y.; Wang, Z.; Gong, H.; Thong, J. T. L. "Large-Diameter Graphene Nanotubes Synthesized Using Ni Nanowire Templates" Nano Lett. 2010, 10, 4844-4850.
Su, C.-Y.; Lu, A.-Y.; Wu, C.-Y.; Li, Y.-T.; Liu, K.-K.; Zhang, W.; Lin, S.-Y.; Juang, Z.-Y.; Zhong, Y.-L.; Chen, F.-R.; Li, L.-J. "Direct Formation of Wafer Scale Graphene Thin Layers on Insulating Substrates by Chemical Vapor Deposition" Nano Lett. 2011, 11, 3612-3616.
Ismach, A.; Druzgalski, C.; Penwell, S.; Schwartzberg, A.; Zheng, M.; Javey, A.; Bokor, J.; Zhang, Y. "Direct Chemical Vapor Deposition of Graphene on Dielectric Surfaces" Nano Lett. 2010, 10, 1542-1548.
Li, X.; Cai, W.; An, J.; Kim, S.; Nah, J.; Yang, D.; Piner, R.; Velamakanni, A.; Jung, I.; Tutuc, E.; Banerjee, S. K.; Colombo, L.; Ruoff, R. S. "Large-Area Synthesis of High-Quality and Uniform Graphene Films on Copper Foils" Science 2009, 324, 1312-1314.
Reina, A.; Jia, X. T.; Ho, J.; Nezich, D.; Son, H. B.; Bulovic, V.; Dresselhaus, M. S.; Kong, J. "Large Area, Few-Layer Graphene Films on Arbitrary Substrates by Chemical Vapor Deposition" Nano Lett. 2009, 9, 30-35.
Safron, N. S.; Kim, M.; Gopalan, P.; Arnold, M. S. "Barrier-Guided Growth of Micro- and Nano-Structured Graphene" Adv. Mater. 2012; 24, 1041-5.
Ferrari, A. C.; Meyer, J. C.; Scardaci, V.; Casiraghi, C.; Lazzeri, M.; Mauri, F.; Piscanec, S.; Jiang, D.; Novoselov, K. S.; Roth, S.; Geim, A. K. "Raman Spectrum of Graphene and Graphene Layers" Phys. Rev. Lett. 2006, 97, 187401.
Malard, L. M.; Pimenta, M. A.; Dresselhaus, G.; Dresselhaus, M. S. "Raman spectroscopy in grapheme" Phys. Rep. 2009, 473, 51-87.
Wang, Y. Y.; Ni, Z. H.; Yu, T.; Shen, Z. X.; Wang, H. M.; Wu, Y. H.; Chen, W.; Shen Wee, A. T. J. "Raman Studies of Monolayer Graphene: The Substrate Effect" Phys. Chem. C 2008, 112, 10637-10640.
Huang, M.; Yan, H.; Chen, C.; Song, D.; Heinz, T. F.; Hone, J. "Phonon softening and crystallographic orientation of strained graphene studied by Raman spectroscopy" Proc. Natl Acad. Sci. 2009, 106, 7304-7308.
Xie, L.; Wang, H.; Jin, C.; Wang, X.; Jiao, L.; Suenaga, K.; Dai, H. "Graphene Nanoribbons from Unzipped Carbon Nanotubes: Atomic Structures, Raman Spectroscopy, and Electrical Properties" J. Am. Chem. Soc. 2011, 133, 10394-10397.
Xu, G.; Torres, C. M.; Zhang, Y.; Liu, F.; Song, E. B.; Wang, M.; Zhou, Y.; Zeng, C.; Wang, K. L. "Effect of Spatial Charge Inhomogeneity on 1/f Noise Behavior in Graphene" Nano Lett. 2010, 10, 3312-3317.
Suk, J. W.; Kitt, A.; Magnuson, C. W.; Hao, Y.; Ahmed, S.; An, J.; Swan, A. K.; Goldberg, B. B.; Ruoff, R. S. "Transfer of CVD-Grown Monolayer Graphene onto Arbitrary Substrates" ACS Nano 2011, 5, 6916-6924.
Chan, J.; Venugopal, A.; Pirkle, A.; McDonnell, S.; Hinojos, D.; Magnuson, C. W.; Ruoff, R. S.; Colombo, L.; Wallace, R. M.; Vogel, E. M. "Reducing Extrinsic Performance-Limiting Factors in Graphene Grown by Chemical Vapor Deposition" ACS Nano 2012, 6, 3224-3229.
Ryu, S.; Liu, L.; Berciaud, S.; Yu, Y.-J.; Liu, H.; Kim, P.; Flynn, G. W.; Brus, L. E. "Atmospheric Oxygen Binding and Hole Doping in Deformed Graphene on a SiO2 Substrate" Nano Lett. 2010, 4944-4951.
Balandin, A. A. "Thermal properties of graphene and nanostructured carbon materials" Nat. Mater. 2011, 10, 569-81.
Iñigo Martin-Fernandez and Yuegang Zhang, "Direct Growth of Graphene Nanoribbons for Graphene Device Fabrication" 2012 Materials Research Society spring meeting, Apr. 12, 2012, San Francisco California.

* cited by examiner

METHODS OF FABRICATION OF GRAPHENE NANORIBBONS

CROSS REFERENCE TO RELATED APPLICATIONS

This application claims priority to U.S. Provisional Patent Application No. 61/656,669, filed Jun. 7, 2012, which is herein incorporated by reference.

STATEMENT OF GOVERNMENTAL SUPPORT

This invention was made with government support under Contract No. DE-AC02-05CH11231 awarded by the U.S. Department of Energy. The government has certain rights in this invention.

FIELD

Embodiments disclosed herein relate generally to graphene and in particular to graphene nanoribbons and methods of fabrication thereof.

BACKGROUND

Graphene has a potential for use in future high speed and low power electronics due to its unique transport properties. The zero bandgap nature of two dimensional (2D) graphene, however, cannot provide the high current on/off ratio required of mainstream electronic switching devices, such as field effect transistors, for example.

SUMMARY

One innovative aspect of the subject matter described in this disclosure can be implemented in a device including a substrate and a first graphene nanoribbon overlying the substrate. The first graphene nanoribbon is less than about 20 nanometers wide.

In some embodiments, the first graphene nanoribbon is less than about 15 nanometers wide. In some embodiments, the first graphene nanoribbon is less than about 10 nanometers wide. In some embodiments, the first graphene nanoribbon is about 5 nanometers wide. In some embodiments, the first graphene nanoribbon is about 1 nanometer wide. In some embodiments, a variation in the width of the first graphene nanoribbon is less than about 1 nanometer.

In some embodiments, the substrate comprises silicon. In some embodiments, the substrate includes a layer of silicon dioxide disposed on one surface of the substrate, with the first graphene nanoribbon disposed on the layer of silicon dioxide. In some embodiments, a length of the first graphene nanoribbon is greater than about 40 microns.

In some embodiments, the device further includes a second graphene nanoribbon overlying the substrate, and the second graphene nanoribbon is less than about 20 nanometers wide. An edge of the first graphene nanoribbon and an edge of the second graphene nanoribbon are not in contact with each other and are substantially parallel to each other.

In some embodiments, the device further includes a second graphene nanoribbon overlying the substrate, and the second graphene nanoribbon is less than about 20 nanometers wide. An edge of the second graphene nanoribbon overlies an edge of the first graphene nanoribbon and the edge of the second graphene nanoribbon is substantially parallel to the edge of the first graphene nanoribbon.

In some embodiments, the device further includes a second graphene nanoribbon overlying the substrate, and the second graphene nanoribbon is less than about 20 nanometers wide. An edge of the second graphene nanoribbon contacts an edge of the first graphene nanoribbon, and the edge of the second graphene nanoribbon is substantially parallel to the edge of the first graphene nanoribbon.

Another innovative aspect of the subject matter described in this disclosure can be implemented in method including (a) depositing a catalyst layer on a substrate, (b) depositing a masking layer on the catalyst layer, (c) patterning the masking layer and the catalyst layer to form a plurality of structures on the substrate, with a portion of the catalyst layer being exposed, and forming a graphene layer on the exposed catalyst layer by exposing the substrate to a carbon-containing gas at a temperature that thermally decomposes the gas.

In some embodiments, the catalyst layer is selected from a group consisting of nickel, copper, cobalt, iron, molybdenum, titanium, and tungsten. In some embodiments, the catalyst layer comprises nickel. In some embodiments, the masking layer comprises aluminum oxide. In some embodiments, the carbon-containing gas is selected from a group consisting of methane, ethane, ethylene, and acetylene. In some embodiments, the temperature is about 700° C. to 1000° C. in operation (d).

In some embodiments, the method further includes removing the masking layer and the catalyst layer after operation (d). In some embodiments, a thickness of the catalyst layer is about 1 nanometer to 20 nanometers. In some embodiments, the substrate comprises silicon. In some embodiments, the graphene layer is less than about 20 nanometers wide.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Introduction

Theoretical and experimental results have demonstrated that the bandgap of a graphene nanoribbon (GNR) scales with the inverse of its width and that the bandgap is also dependent on the atomic structure of the graphene nanoribbon edges; a graphene nanoribbon is a quasi one-dimensional (1D) graphene strip. Thus, a very narrow (e.g., less than about 10 nanometers (nm)) graphene nanoribbon with clean edges may open a large enough band gap to achieve the high on/off current ratio needed in nanoelectronics.

Different technical approaches have been used in attempts to open a bandgap in graphene, including the use of bi-layer graphene device structures, applying strain to graphene, patterning of graphene nanomeshes, or patterning of graphene nanoribbons (GNRs). Most reported approaches for the graphene nanoribbon patterning, however, cannot satisfy the requirements of both the precise control over the width and edges and the scalability of the process. For example, the most straightforward method for graphene nanoribbon fabrication is slicing up a pre-deposited graphene layer, typically by lithography and plasma etching. With this approach, however, it is difficult to achieve a graphene nanoribbon width of less than about 10 nm due to the resolution limitation of lithography. The approach also yields rough graphene nanoribbon edges, which reduces carrier mobility and can significantly limit device performance.

Devices/Methods

A process for forming graphene nanoribbons using chemical vapor deposition (CVD) techniques has been developed. This scalable method for the direct growth of graphene nanoribbons on substrates (e.g., silicon or silicon dioxide substrates) takes advantage of the surface-selective catalytic reactivity of a sacrificial nano-template to promote local graphene growth in a CVD process. Using this method, die-scale field-effect transistor arrays have been fabricated consisting of well-registered graphene nanoribbons with widths of about 20 nm or less, with lengths of several microns to about 40 microns or more. Graphene nanoribbons of smaller widths, down to about 10 nm and even lower (e.g., about 1 nm), may also be fabricated. Results from experiments demonstrate that precise control in width, length, and position of the graphene nanoribbons is possible by this method. This method is also compatible with current processing methods used with integrated circuits.

In some embodiments, a template for graphene growth is provided by a patterned catalyst layer. In some embodiments, the graphene layer may form at a surface of the catalyst layer at those locations where the catalyst layer is exposed. In some embodiments, graphene may not be formed on surfaces other than surfaces of the catalyst layer. In some embodiments, the source of graphene carbon is a carbon-containing gas.

Figure 1:
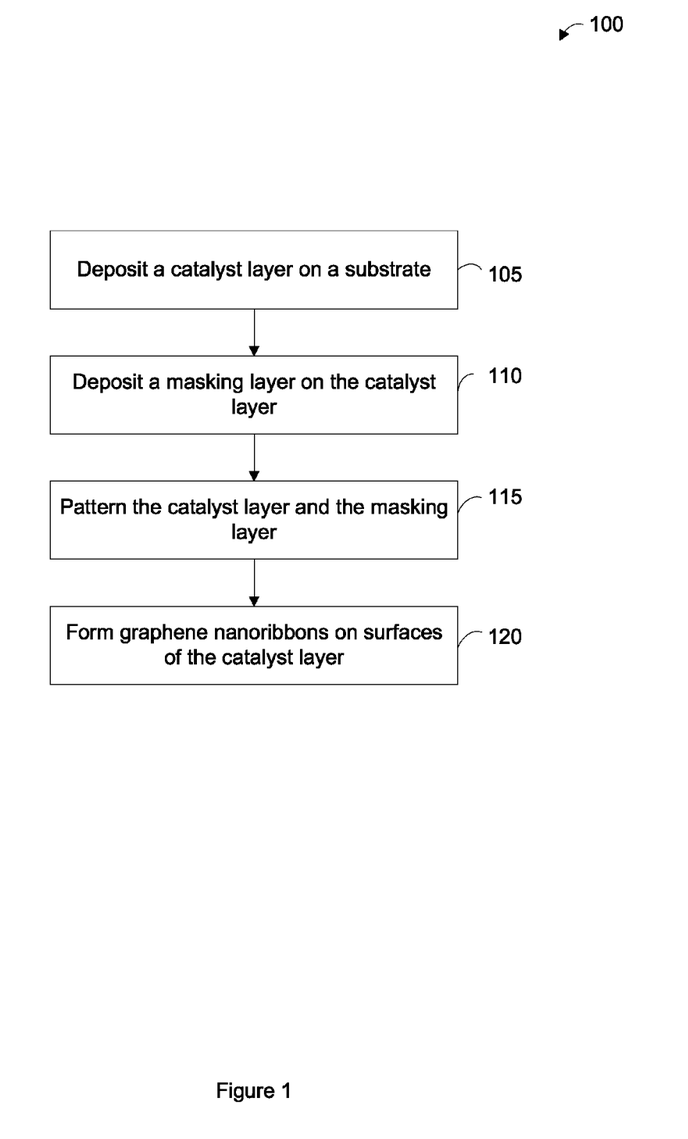
FIG. 1 shows an example of a fabrication process for a graphene nanoribbon.
Figure 2A:
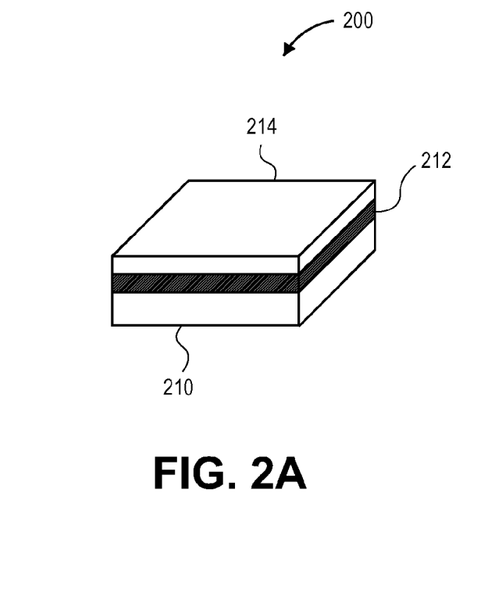
FIGS. 2A-2C show examples of schematic illustrations of a graphene nanoribbon at various stages in a process of fabricating the graphene nanoribbon.
Figure 2B:
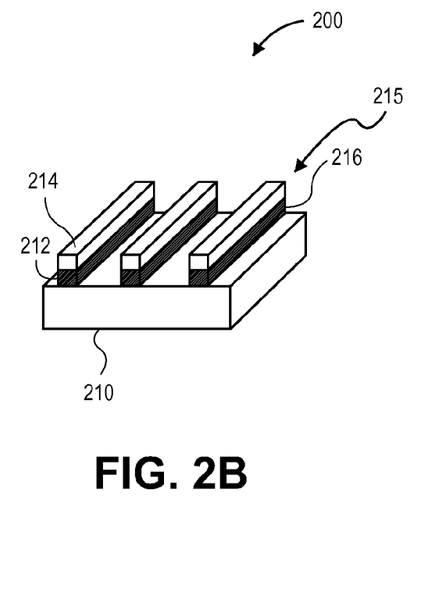
Figure 2C:
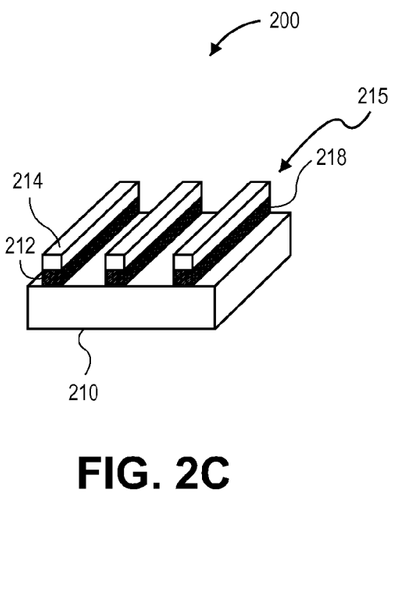

FIG. 1 shows an example of a fabrication process for a graphene nanoribbon. FIGS. 2A-2C show examples of schematic illustrations of a graphene nanoribbon at various stages in a process of fabricating the graphene nanoribbon. In operation 105 of the process 100 shown in FIG. 1, a catalyst layer is deposited on a substrate. In some embodiments, the substrate may comprise a semiconductor material. In some embodiments, the substrate may comprise silicon (Si). In some embodiments, the substrate may be a silicon wafer. In some embodiments, the substrate may comprise silicon dioxide ($SiO_2$).

In some embodiments, the catalyst layer may comprise a metal. In some embodiments, the catalyst layer may comprise copper (Cu) or nickel (Ni). In some embodiments, Ni rather than Cu may be used for the catalyst layer due to the higher melting temperature of Ni. In some embodiments, the catalyst layer may comprise a high melting point metal such as molybdenum (Mo), cobalt (Co), iron (Fe), tungsten (W), or titanium (Ti), for example. In some embodiments, the catalyst layer may comprise a non-metal, such as silicon carbide (SiC), for example. The catalyst layer may be deposited using techniques known to one of ordinary skill in the art. In some embodiments, the catalyst layer may be deposited using electron-beam evaporation, sputtering, or atomic layer deposition (ALD). In some embodiments, the catalyst layer may be about 1 nm to 20 nm thick. In some embodiments, the catalyst layer may be less than about 20 nm thick, less than about 15 nm thick, less than about 10 nm thick, about 5 nm thick, or about 1 nm thick.

In operation 110 of the process 100, a masking layer is deposited on the catalyst layer. A masking layer may also be referred to as a capping layer. In some embodiments, the masking layer may include alumina ($Al_2O_3$). In some embodiments, the catalyst layer may include Ni and the masking layer may include $Al_2O_3$; $Al_2O_3$ does not form alloys with Ni at the temperatures at which CVD to form the graphene nanoribbons is performed. Other masking layer materials may be used so long as they are not etched away to expose the underlying catalyst during the etching process described below in operation 115. For example, the masking layer may comprise silicon dioxide, silicon nitride, hafnium silicate, zirconium silicate, hafnium dioxide, or zirconium dioxide. The masking layer may be deposited using techniques known to one of ordinary skill in the art. In some embodiments, the marking layer may be deposited using electron-beam evaporation, sputtering, or atomic layer deposition. In some embodiments, the masking layer may be about 2 nm to 500 nm thick. In some embodiments, in operation 120, graphene may not form on surfaces of the masking layer.

FIG. 2A shows an example of a device at this point in the process 100. A device 200 includes a substrate 210 with a catalyst layer 212 overlying the substrate 210 and a masking layer 214 disposed on the catalyst layer 212.

In some embodiments, the substrate 210 may include a layer of silicon dioxide ($SiO_2$, not shown) disposed on a surface of the substrate, with the catalyst layer 212 disposed on the layer of $SiO_2$. The layer of $SiO_2$ may serve as a dielectric layer in a device.

Turning back to FIG. 1, in operation 115 of the process 100, patterning techniques, including masking and etching processes, may be used to define shapes of different structures of the catalyst layer/masking layer on the substrate. For example patterning techniques may include depositing a photoresist layer on the masking layer, exposing/developing the photoresist layer, and etching (e.g., using conventional etching techniques) the masking layer and the catalyst layer. In some embodiments, the etching may be wet chemical etching (e.g., using phosphoric acid ($H_3PO_4$)/nitric acid ($HNO_3$)).

FIG. 2B shows an example of the device 200 at this point in the process 100. The device 200 includes the substrate 210 with structures 215 including the masking layer 214 disposed on the catalyst layer 212. Surfaces 216 of the catalyst layer 212 are exposed.

Turning back to FIG. 1, in operation 120 of the process 100, graphene nanoribbons are formed on the catalyst layer. In some embodiments, the graphene nanoribbons are formed on the exposed surfaces of the catalyst layer. In some embodiments, the graphene nanoribbons are formed with a chemical vapor deposition (CVD) process. In some embodiments, methane, ethane, ethylene, and the like, may be used as CVD precursors. In some embodiments, acetylene is used a CVD precursor. These gasses pyrolyze at process temperatures of about 700° C. to 1000° C. to form a graphene layer on the exposed catalyst layer surfaces. The process temperature used for operation 120 depends on the thermal decomposition temperature of the carbon containing gas and the material of the catalyst layer. For example, when using Ni for the catalyst layer, the process temperature may be about 700° C. to 725° C. The CVD process can generally be conducted at about 20 Torr (T) pressure, and pressures can be about 1 milliTorr (mT) to 800 T.

In some embodiments, the masking layer may aid in preventing the catalyst layer from dewetting into particles and in maintaining the continuity of the catalyst layer. The masking layer may prevent the evaporation of the catalyst layer during the fabrication process, and the catalyst volume can remain constant.

In some embodiments, the graphene nanoribbons are formed with plasma enhanced CVD (PECVD) processes, which may allow for lower processing temperatures; the plasma may provide energy to decompose the carbon-containing precursor, which can allow for the use of a lower temperature.

FIG. 2C shows an example of the device 200 at this point in the process 100. The device 200 includes the substrate 210 with the structures 215 including the masking layer 214 disposed on the catalyst layer 212. Graphene nanoribbons 218 are disposed on the surfaces of the catalyst layer 212. Thus, by the process 100 shown in FIG. 1, thin graphene nanoribbons can be formed, the width of the nanoribbon being determined by the height of the sidewalls of the catalyst layer. An edge of a graphene nanoribbon can be characterized by an edge roughness, which is the variation in the width of the graphene nanoribbon. In some embodiments, the edge roughness or the variation in the width of the graphene nanoribbons 218 is less than about 1 nm.

In some embodiments, the process 100 may continue with the removal of the structures comprising the catalyst layer and the masking layer. In some embodiments, when the structures comprising the catalyst layer and the masking layer are removed, the graphene nanoribbons can collapse or lay down in-place on the substrate, forming nanoribbons on the substrate surface. That is, removing the structures comprising the catalyst layer and the masking layer may allow planar surfaces of the graphene nanoribbons to be disposed on the substrate. In some embodiments, when the as-deposited height of the catalyst layer is greater than half the width of an individual structure, the graphene nanoribbons may overlap each other when on the surface of the substrate, forming a graphene sheet. Such a graphene sheet will have areas which are a single graphene nanoribbon thick, and areas which are two graphene nanoribbons thick (i.e., where two graphene nanoribbons overlap). In some embodiments, when the as-deposited height of the catalyst layer is the same as half the width of an individual structure, the edges of the graphene nanoribbons may touch when on the surface of the substrate, which may form a graphene sheet. In some embodiments, when the as-deposited height of the catalyst layer is less than half the width of an individual structure, the graphene nanoribbons will not overlap, which may result in narrow graphene nanoribbons on the substrate surface running parallel to each other.

Figure 3:
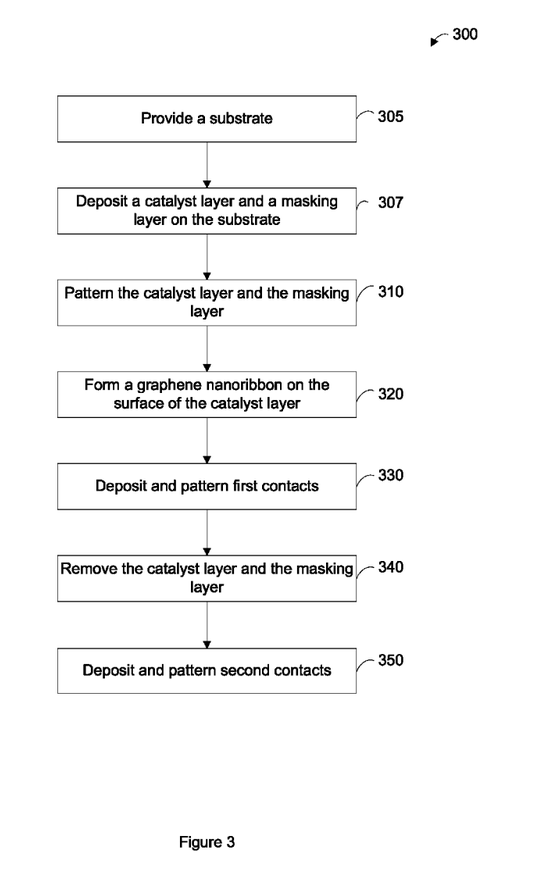
FIG. 3 shows an example of a fabrication process for a device including a graphene nanoribbon.

FIG. 3 shows an example of a fabrication process for a device including a graphene nanoribbon. FIGS. 4A-4F show examples of schematic illustrations of a device at various stages in a process of fabricating the device. In some embodiments, some operations in the process 300 shown in FIG. 3 may be similar to operations of the process 100 shown in FIG. 1.

Figure 4A:
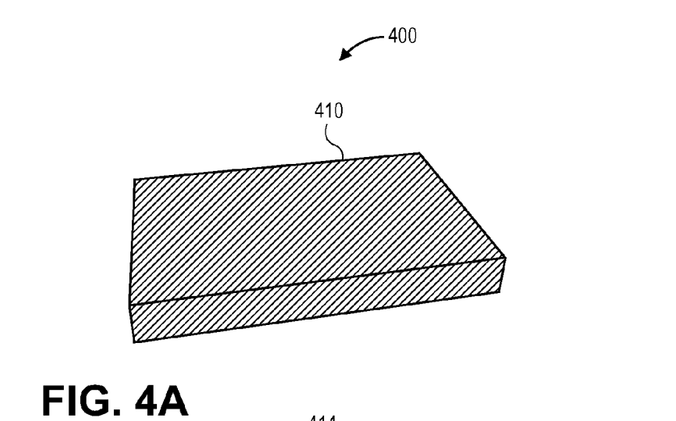
FIGS. 4A-4F show examples of schematic illustrations of a device at various stages in a process of fabricating the device.

In operation 305 of the process 300, a substrate is provided. In some embodiments, the substrate may be a silicon substrate. FIG. 4A shows an example of the device 400, including a substrate 410, at this point in the process 300.

Turning back to FIG. 3, in operation 307 of the process 300, a catalyst layer is deposited on the substrate and a masking layer is deposited on the catalyst layer. In operation 310, the catalyst layer and the masking layer are patterned.

Figure 4B:
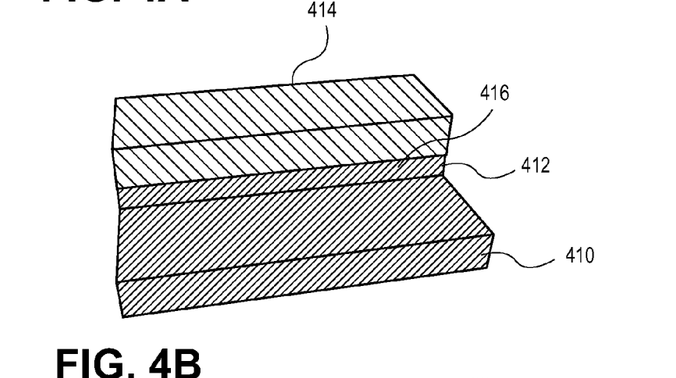

FIG. 4B shows an example of the device 400 at this point in the process 300. The device 400 includes the substrate 410 with a catalyst layer 412 disposed on the substrate 410 and a masking layer 414 disposed on a catalyst layer 412. The catalyst layer 412 and the masking layer 414 have been patterned to expose a surface 416 of the catalyst layer 412.

Turning back to FIG. 3, in operation 320 of the process 300, a graphene nanoribbon is formed on the surface of the catalyst layer. Details of operation 320 are given above in the description of operation 120 with respect to FIG. 1.

Figure 4C:
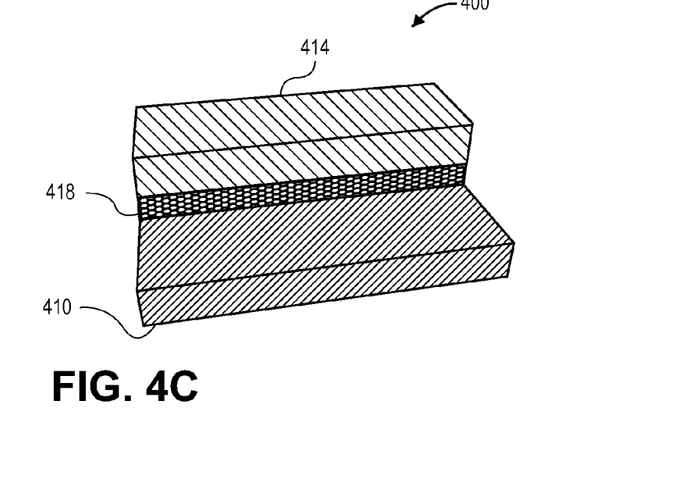

FIG. 4C shows an example of the device 400 at this point in the process 300. The device 400 includes the substrate 410 including the masking layer 414 disposed on the catalyst layer. A graphene nanoribbon 418 is disposed on the surface of the catalyst layer.

Turning back to FIG. 3, in operation 330 of the process 300, first contacts are deposited and patterned. In some embodiments, the first contacts may be deposited using a physical vapor deposition (PVD) process, such as thermal evaporation, electron-beam evaporation, or sputtering, for example. In some embodiments, the first contacts may comprise a metal. In some embodiments, the first contacts may comprise a layer of chromium (Cr) and a layer of gold (Au). In some embodiments, the first contacts may serve to anchor the graphene nanoribbon to the substrate.

Figure 4D:
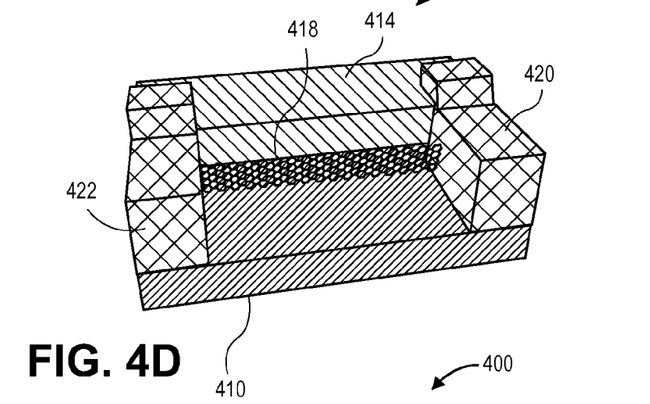

FIG. 4D shows an example of the device 400 at this point in the process 300. The device 400 includes the substrate 410 with the masking layer 414 disposed on the catalyst layer. The graphene nanoribbon 418 is disposed on the surface of the catalyst layer. First contacts 420 and 422 are disposed on the substrate 410 and the masking layer 414 and contact the graphene nanoribbon 418.

Turning back to FIG. 3, in operation 340 of the process 300, the masking layer and the catalyst layer are removed. In some embodiments, the masking layer and the catalyst layer may be removed with an etching process. In some embodiments, the etching process may be a wet chemical etching process (e.g., using $H_3PO_4/HNO_3$).

Figure 4E:
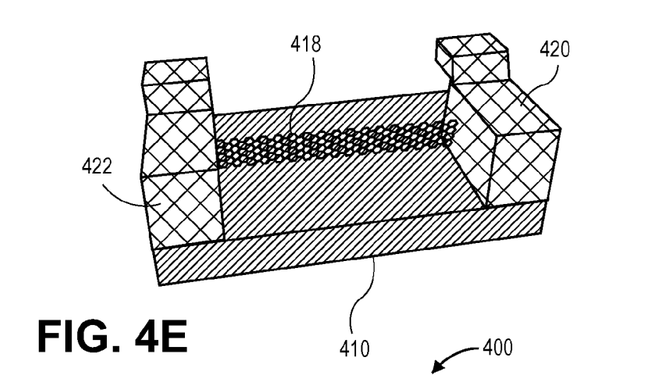

FIG. 4E shows an example of the device 400 at this point in the process 300. The device 400 includes the substrate 410 and the first contracts 420 and 422 disposed on the substrate 410, supporting the graphene nanoribbon 418. In some embodiments, the graphene nanoribbon 418 may be oriented in a vertical orientation, with one edge of the graphene nanoribbon 418 in contact with the substrate 410 and one edge of the graphene nanoribbon 418 in free space (i.e., not in contact with the substrate).

Turning back to FIG. 3, in operation 350 of the process 300, second contacts are deposited and patterned. In some embodiments, the second contacts may be deposited using a PVD process, such as thermal evaporation, for example. In some embodiments, the second contacts may comprise a metal. In some embodiments, the second contacts may comprise a layer of Cr and a layer of Au.

Figure 4F:
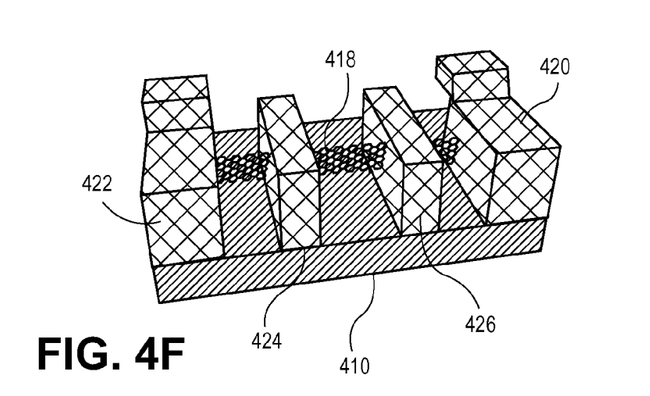

FIG. 4F shows an example of the device 400 at this point in the process 300. The device 400 includes the substrate 410, the first contracts 420 and 422 disposed on the substrate 410 supporting the graphene nanoribbon 418, and second contacts 424 and 426 disposed on the substrate 410 and in contact with the graphene nanoribbon 418.

In the embodiments described above in FIGS. 1 and 3, it is to be appreciated that the height of the catalyst layer defines the width of the graphene nanoribbon formed; the greater the height of the catalyst layer, the wider the graphene nanoribbon. Thus, for very thin nanoribbons, thin layers of the catalyst layer may be used. For example, for a catalyst layer about 10 nm thick, or even less, the resulting graphene nanoribbon or nanoribbons will correspondingly be formed in widths of about 10 nm, or less.

The disclosed graphene nanoribbon fabrication method has many advantages over previous graphene nanoribbon fabrication methods. First, if the catalyst layer is scaled down to about a few angstroms thick, graphene nanoribbons with bandgaps larger than about 0.5 eV or about 1 eV may be produced. Second, the morphology of the catalyst layer determines the length and the position of the graphene nanoribbon. Third, the fabrication method may be compatible with numerous catalyst layer/masking layer combinations, so long as the layers are compatible with the temperatures during the fabrication method.

The formation of ripples and the defects that originate after graphene transfer may be reduced or avoided using the methods disclosed herein. Achieving atomically precise catalyst layer/masking layer interfaces may minimize the formation of graphene plateaus; a graphene plateau is an imperfect portion of a graphene nanoribbon formed when graphene grows in a gap that may exist between the catalyst layer and the masking layer. Achieving atomically precise catalyst layer/masking layer interfaces also may lead to the growth of graphene nanoribbons with atomically precise edges (i.e., edges with low or no edge roughness). The methods disclosed herein can be scaled to any size substrate and can be made compatible with current semiconductor post-processing methods.

Experimental Description

In an experiment conducted according to one embodiment, after $Ni/Al_2O_3$ multilayer patterning, graphite nanoribbons (GNRs) were grown using CVD at 725° C. by a recipe similar to that described in Wang, R., Hao, Y., Wang, Z., Gong, H. & Thong, J. T. L., Large-Diameter Graphene Nanotubes Synthesized Using Ni Nanowire Templates, Nano Letters 10, 4844-4850 (2010) (which is herein incorporated by reference), using a mixture of ethylene ($C_2H_4$), hydrogen ($H_2$), and argon (Ar) as a process gas. Then, first contacts were deposited and patterned to anchor the graphene nanoribbon to the substrate before etching to remove the $Ni/Al_2O_3$. Second contacts were also deposited and patterned.

This process was applied to the fabrication of test chips hosting hundreds of test structures. Since an about 20 nm thick Ni layer was deposited in the fabrication of the chips, the growth of about 20 nm wide graphene nanoribbons was expected during the CVD process. The graphene nanoribbons appeared to have a wavy morphology, which may have resulted from the use of a low throughput photomask (+/−0.5 micron feature tolerance) in the patterning processes. Potential solutions to this issue may be to use a higher throughput photomask or to use other patterning techniques that enable higher resolution, such as e-beam lithography or nanoimprint lithography, for example. Further, the graphene plateaus grew locally towards the inside of the $Ni/Al_2O_3$ multilayer. It is believed that these plateaus formed at the boundaries between Ni grains at the Ni—$Al_2O_3$ interface because of the higher diffusion of the carbon atoms at that interface. Methods to reduce or to minimize this plateau formation may include improvements in Ni and $Al_2O_3$ deposition and patterning conditions.

CONCLUSION

Further details regarding the embodiments described herein can be found in "Direct Growth of Graphene Nanoribbons for Large-Scale Device Fabrication," by Hugo Martin-Fernandez, Debin Wang, and Yuegang Zhang, Nano Lett., 2012, 12 (12), pp 6175-6179, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   (a) depositing a catalyst layer on a substrate;
   (b) depositing a masking layer on the catalyst layer;
   (c) etching the masking layer and the catalyst layer to form a structure on the substrate, the structure comprising a portion of the catalyst layer and a portion of the masking layer disposed on the catalyst layer, sidewalls of the catalyst layer being exposed; and
   (d) forming a graphene layer on a sidewall of the catalyst layer with a carbon-containing gas.

2. The method of claim 1, wherein the catalyst layer is selected from a group consisting of nickel, copper, cobalt, iron, molybdenum, titanium, and tungsten.

3. The method of claim 1, wherein the catalyst layer comprises nickel.

4. The method of claim 3, wherein the masking layer comprises aluminum oxide.

5. The method of claim 1, wherein the carbon-containing gas is selected from a group consisting of methane, ethane, ethylene, and acetylene.

6. The method of claim 1, wherein operation (d) is performed at a temperature that thermally decomposes the carbon-containing gas, and wherein the temperature is about 700° C. to 1000° C.

7. The method of claim 1, further comprising:
   after operation (d), removing the portion of the masking layer and the portion of the catalyst layer.

8. The method of claim 7, wherein after removing the portion of the masking layer and the portion of the catalyst layer, a surface of the graphene layer that was disposed on the sidewall of the catalyst layer is disposed on the substrate.

9. The method of claim 1, wherein a thickness of the catalyst layer deposited on the substrate is about 1 nanometer to 20 nanometers.

10. The method of claim 9, wherein a width of the graphene layer is determined in part by the thickness of the catalyst layer, and wherein the graphene layer is about 1 nanometer to 20 nanometers wide.

11. The method of claim 9, wherein a height of the sidewalls of the catalyst layer are determined by the thickness of the catalyst layer deposited on the substrate.

12. The method of claim 1, wherein the substrate comprises silicon.

13. The method of claim 1, wherein the graphene layer is not formed on surfaces of the masking layer or the substrate.

14. The method of claim 1, wherein the graphene layer is not formed on surfaces of the catalyst layer other than the sidewalls of the catalyst layer.

15. The method of claim 1, wherein operation (d) is performed with a plasma enhanced chemical vapor deposition process.

* * * * *